United States Patent
Perrin et al.

(10) Patent No.: US 10,246,022 B2
(45) Date of Patent: Apr. 2, 2019

(54) MAP POCKET ASSEMBLY

(71) Applicant: Lear Corporation, Southfield, MI (US)

(72) Inventors: Philippe Perrin, Rosenheim (DE); Florian Diefenthaler, Oberding-Schwaig (DE); Leonard Levy, Oberding (DE)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 15/668,576

(22) Filed: Aug. 3, 2017

(65) Prior Publication Data

US 2018/0134224 A1    May 17, 2018

(30) Foreign Application Priority Data

Nov. 17, 2016 (DE) ................. 20 2016 106 446 U (51) Int. Cl.
| | |
|---|---|
| B60R 7/04 | (2006.01) |
| B60R 7/00 | (2006.01) |
| B60N 2/90 | (2018.01) |
| B60N 2/64 | (2006.01) |

(52) U.S. Cl.
CPC ............ B60R 7/005 (2013.01); B60N 2/64 (2013.01); B60N 2/90 (2018.02); B60R 7/00 (2013.01)

(58) Field of Classification Search
CPC .... B60R 7/005; B60R 2011/0015; B60N 2/64
USPC .................................................. 297/188.07
See application file for complete search history.

(56) References Cited

U.S. PATENT DOCUMENTS

| | | | | |
|---|---|---|---|---|
| 5,004,295 A | * | 4/1991 | Inoue | B60N 2/70 297/188.07 |
| 5,292,174 A | * | 3/1994 | Ohnuma | B60R 7/043 297/188.07 X |
| 6,131,993 A | * | 10/2000 | Pesta | B60R 7/043 297/188.04 X |
| 7,997,635 B2 | | 8/2011 | Ercolano et al. | |

(Continued)

FOREIGN PATENT DOCUMENTS

| | | | | |
|---|---|---|---|---|
| GB | 2511207 | * | 1/2014 | ............ B60R 7/005 |
| GB | 1401696 A | | 8/2014 | |

(Continued)

OTHER PUBLICATIONS

A2Mac1 Automotive Benchmarking, https://www.a2mac1.com, accessed on Aug. 31, 2016, 1 page.

*Primary Examiner* — Rodney B White
(74) *Attorney, Agent, or Firm* — Brooks Kushman P.C.

(57) ABSTRACT

A map pocket assembly is provided with a seat back panel adapted to attach to a seat back, a map pocket panel coupled to the seat back panel and moveable between a closed position and an open position relative to the seat back panel to define a pocket opening therebetween, and a spring arm coupling the seat back panel to the map pocket panel to bias the map pocket panel to the closed position. The spring arm has first and second spring fingers extending from a spring base coupled to one of the seat back panel and the map pocket panel. The first and second spring fingers are moved to a spring angle relative to each other when the map pocket panel is moved to the open position that is greater than the spring angle when the map pocket panel is in the closed position.

20 Claims, 4 Drawing Sheets

(56) References Cited

U.S. PATENT DOCUMENTS

| | | | | |
|---|---|---|---|---|
| 8,020,936 B2 * | 9/2011 | Asami | ............... | A47C 7/40 |
| | | | | 297/188.04 |
| 8,152,234 B2 * | 4/2012 | Terleski | ............ | B64D 11/0636 |
| | | | | 297/188.04 |
| 8,544,928 B2 * | 10/2013 | Orlowsky | ............... | B60R 7/046 |
| | | | | 224/543 |
| 9,216,692 B2 * | 12/2015 | Brinster | ............... | B60R 7/005 |
| 9,573,528 B1 * | 2/2017 | Line | ............... | B60R 7/005 |
| 2008/0001423 A1 * | 1/2008 | Ercolano | ............... | B60R 7/005 |
| | | | | 296/37.8 |
| 2009/0021037 A1 | 1/2009 | Smetham et al. | | |
| 2012/0152992 A1 * | 6/2012 | Baas | ............... | B60R 7/005 |
| | | | | 224/275 |
| 2018/0201196 A1 * | 7/2018 | Hellman | ............... | B60Q 3/225 |

FOREIGN PATENT DOCUMENTS

| | | | | |
|---|---|---|---|---|
| GB | 2511207 A * | 8/2014 | ............ | B60R 7/005 |
| KR | 100828785 B1 | 5/2008 | | |
| WO | WO-2007082523 A2 * | 7/2007 | ............ | B60R 7/043 |

\* cited by examiner

MAP POCKET ASSEMBLY

CROSS-REFERENCE TO RELATED APPLICATIONS

This application claims foreign priority benefits under 35 U.S.C. § 119(a)-(d) to DE 20 2016 106 446.5, filed Nov. 17, 2016, the disclosure of which is hereby incorporated by reference in its entirety.

TECHNICAL FIELD

The various embodiments relate to vehicles and vehicle seats with map pocket assemblies.

BACKGROUND

Vehicles may include various compartments and pockets for storing objects. For example and without limitation, these compartments and pockets (which may be referred to as "map pockets" or "map pocket assemblies") may be disposed on the seats, doors, or instrument panel.

SUMMARY

According to at least one embodiment, a map pocket assembly is provided with a seat back panel, a map pocket panel, and a spring arm. The seat back panel is adapted to attach to a seat back. The map pocket panel is coupled to the seat back panel and moveable between a closed position and an open position relative to the seat back panel to define a pocket opening therebetween. The spring arm couples the seat back panel to the map pocket panel to bias the map pocket panel to the closed position. The spring arm has first and second spring fingers extending from a spring base coupled to one of the seat back panel and the map pocket panel, the first spring finger coupled to the seat back panel and the second spring finger coupled to the map pocket panel. The first and second spring fingers are moved to a spring angle relative to each other when the map pocket panel is moved to the open position that is greater than the spring angle when the map pocket panel is in the closed position.

According to another embodiment, the spring base is coupled to the map pocket panel such that the spring base travels a fore-aft distance with the map pocket panel between the closed and open positions, and the first spring finger is preformed to define a first finger arc to bias one of a top and bottom portion of the map pocket panel to the closed position such that the spring base applies a first force to one of the top and bottom portions of the seat back panel in the closed position.

According to another embodiment, a free end of the second spring finger opposite the spring base applies a second force to the other of the top and bottom portions of the seat back panel in the closed position and moves independently of a distal end of the first spring finger opposite the spring base in the open position, the distal end of the first spring finger being coupled to the seat back panel.

According to another embodiment, the second spring finger is preformed to define a second finger arc to bias the other of the top and bottom portion of the map pocket panel to the closed position.

According to another embodiment, in the closed position the first spring finger conforms to a profile of the seat back panel, and in the open position the first spring finger is curved in a direction opposite of the first finger arc.

According to another embodiment, a height of the second spring finger is less than a height of the first spring finger.

According to another embodiment, the spring arm further comprises a third spring finger hinged together at the spring base with the first and second spring fingers, thereby defining a pair of outer spring fingers and a center spring finger, wherein the third spring finger prevents twisting of the spring base relative to the map pocket panel.

According to another embodiment, the third finger is coupled to the seat back panel.

According to another embodiment, the third finger is preformed to define a third finger arc to bias the map pocket panel to the closed position.

According to another embodiment, the first, second, and third spring fingers are spaced from one another in a lateral direction relative to the map pocket panel.

According to at least one embodiment, a vehicle seat is provided with a seat back panel, a map pocket panel, and a first spring arm. The map pocket panel is coupled to the seat back panel and moveable between a closed position and an open position. The first spring arm is hinged to the seat back panel at a hinge end and coupled to the map pocket panel at a free end such that the free end moves with the map pocket panel between the closed and open positions. The first spring arm is preformed to define a first spring arm arc thereby biasing the map pocket panel to the closed position. In the closed position the first spring arm conforms to a profile of the seat back panel.

According to another embodiment, the free end of the first spring arm applies a first force to the seat back panel in the closed position.

According to another embodiment, the free end of the first spring arm is coupled to a top portion of the map pocket panel.

According to another embodiment, the vehicle seat further includes a second spring arm disposed proximate the first spring arm. The second spring arm is hinged to the seat back panel at a hinge end and coupled to a bottom portion of the map pocket panel at a free end such that the free end of the second spring arm moves with the bottom portion of the map pocket panel between the closed and open positions, and the second spring arm is preformed to define a second spring arm arc thereby biasing the map pocket panel to the closed position and applying a second force to the seat back panel in the closed position.

According to another embodiment, in the open position, the first spring arm is curved in a direction opposite of the first spring arm arc.

According to another embodiment, the hinge end of the first spring arm is disposed proximate a bottom portion of the map pocket panel.

According to at least one embodiment, a vehicle seat is provided with a seat back panel, a map pocket panel, and a support arm. The map pocket panel is coupled to the seat back panel and has a top edge and a bottom edge each moveable between a closed position and an open position relative to the seat back panel to define a map pocket opening therebetween. The support arm is coupled to the seat back panel at a first end and coupled to the map pocket panel at a second end to maintain a fore-aft opening distance of the bottom edge of the map pocket panel generally perpendicular to the seat back panel when the bottom edge is in the open position.

According to another embodiment, the vehicle seat further includes a first elastic member connected between the seat back panel and the map pocket panel adjacent the top edge thereby biasing the top edge of the map pocket panel to the closed position.

According to another embodiment, the vehicle seat further includes a second elastic member connected between the seat back panel and the map pocket panel adjacent the bottom edge thereby biasing the bottom edge of the map pocket panel to the closed position, wherein each of the first and second elastic members are disposed along opposite lateral sides of the map pocket panel.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
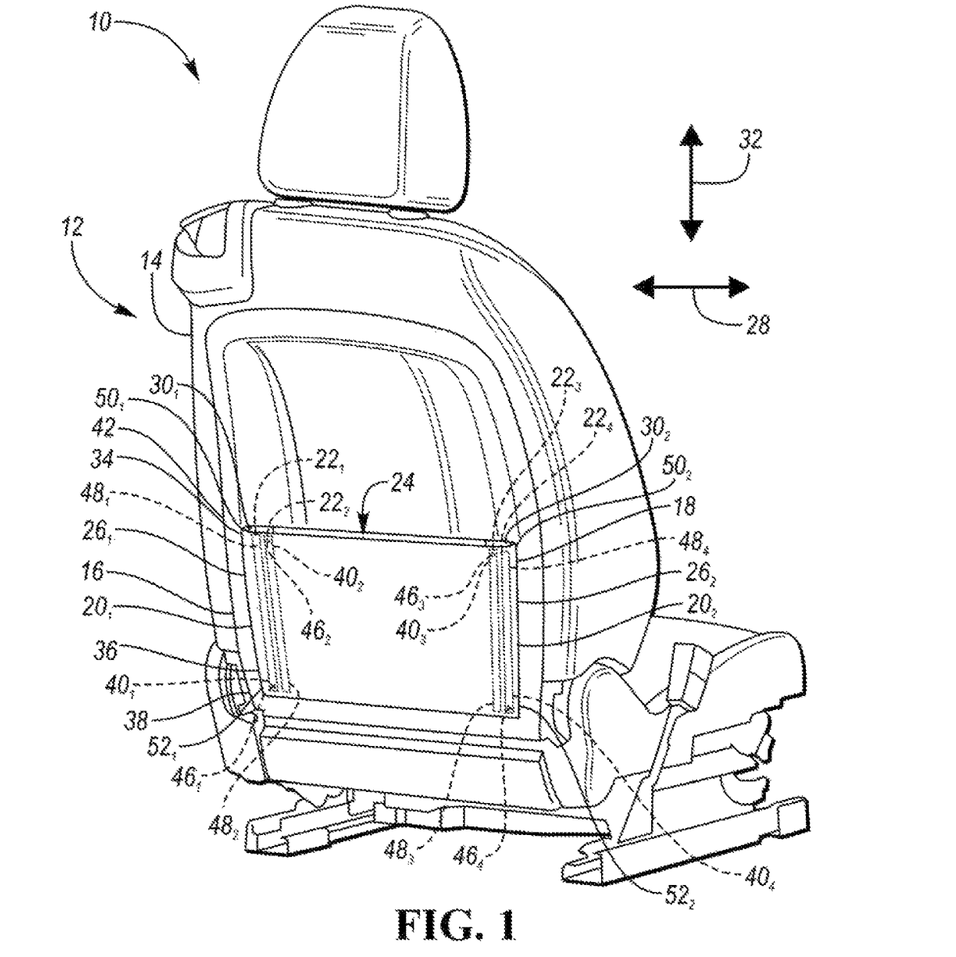
FIG. 1 is a rear perspective view of a vehicle seat having a map pocket assembly in accordance with an embodiment of the instant disclosure.
Figure 3:
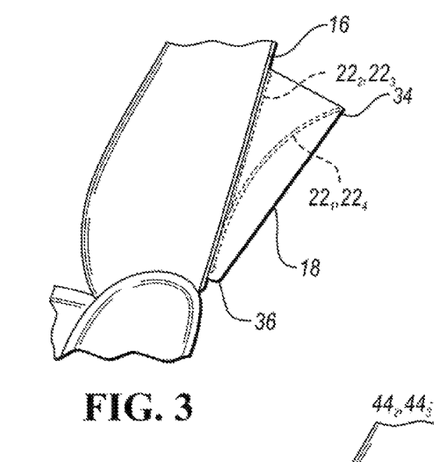
FIG. 3 is a side schematic view of the map pocket assembly of FIG. 1 in a top-open position.
Figure 4:
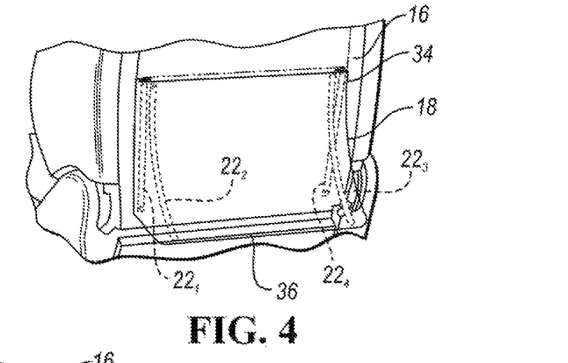
FIG. 4 is a side schematic view of the map pocket assembly of FIG. 1 in a bottom-open position.
Figure 5:
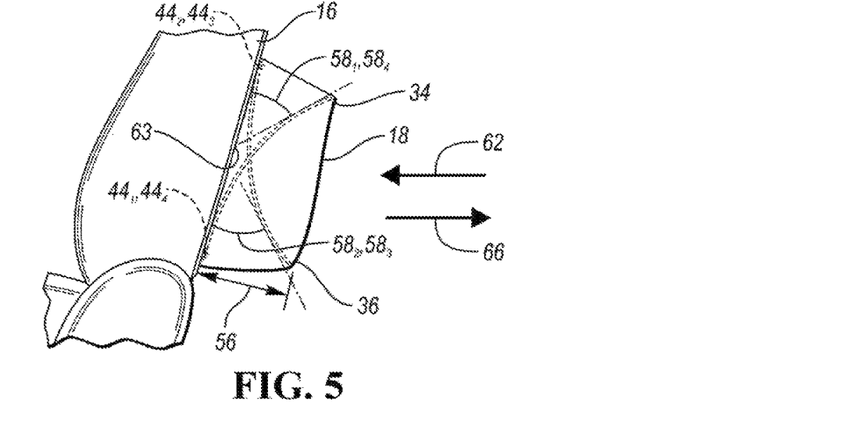
FIG. 5 is a side schematic view of the map pocket assembly of FIG. 1 in an open position.

FIG. 1 is a rear perspective view of a vehicle seat 10 having a map pocket assembly 12 in accordance with an embodiment of the instant disclosure. FIGS. 2-5 are side schematic views of map pocket assembly 12 of FIG. 1 in various positions. Vehicle seat 10 may comprise a seat back 14 and map pocket assembly 12 attached thereto. Map pocket assembly 12 may include a seat back panel 16 adapted to attach to seat back 14, a map panel 18, map pocket side panels $20_1$, $20_2$ (FIGS. 3-5) extending therebetween, and spring arms $22_1$, $22_2$, $22_3$, $22_4$. In one embodiment, map pocket panel 18 is coupled to seat back panel 16 and movable between a closed position and an open position relative to seat back panel 16 to define a pocket opening 24 (FIG. 5). Map pocket panel 18 may include a rigid plastic frame covered with leather and/or fabric. Spring arms $22_1$, $22_2$, $22_3$, $22_4$ may each move independently of one another and be configured to bias map pocket panel 18 to the closed position. Spring arms $22_1$, $22_2$ may be disposed adjacent to one another and adjacent to a lateral side $26_1$ of map pocket panel, and spring arms $22_3$, $22_4$ may be disposed adjacent to one another and to a lateral side $26_2$ of map pocket panel 18 opposite of lateral side $26_1$. Moreover, spring arms $22_1$, $22_2$, $22_3$, $22_4$ may be spaced from one another in a lateral direction 28 relative to map pocket panel 18. In one embodiment, spring arms $22_1$, $22_2$, $22_3$, $22_4$ may be disposed in sleeves $30_1$, $30_2$ between map pocket panel 18 and seat back panel 16 such that spring arms $22_1$, $22_2$, $22_3$, $22_4$ are hidden from view and do not interfere with objects stored within map pocket assembly 12. Although spring arms $22_1$, $22_2$, $22_3$, $22_4$ are illustrated as extending in a vertical direction 32 relative to seat back panel 16, one of ordinary skill in the art will understand that the spring arms may extend at various angles. Moreover, although four spring arms $22_1$, $22_2$, $22_3$, $22_4$ are shown in the illustrated embodiment, one of ordinary skill in the art will understand that more or less may be used.

Still referring to FIG. 1, in the illustrated embodiment, spring arms $22_1$, $22_4$ are configured to bias a top portion 34 of map pocket panel 18, and spring arms $22_2$, $22_3$ are configured to bias a bottom portion 36 of map pocket panel 18 opposite top portion 34. Spring arms $22_1$, $22_4$ may be hinged at a bottom portion 38 of seat back panel 16 at hinge ends $40_1$, $40_4$, respectively, and spring arms $22_2$, $22_3$ may be hinged at a top portion 42 of seat back panel 16 at hinge ends $40_2$, $40_3$, respectively. Hinge ends $40_1$, $40_2$, $40_3$, $40_4$ may each include a thru-hole $44_1$, $44_2$, $44_3$, $44_4$, respectively (FIG. 5), through which a fastening member $46_1$, $46_2$, $46_3$, $46_4$ may extend into seat back panel 16. One of ordinary skill in the art will understand that the spring arms may be hinged to the seat back panel in a number of different ways and at various locations on the seat back panel other than at its top and bottom portions.

Figure 2:
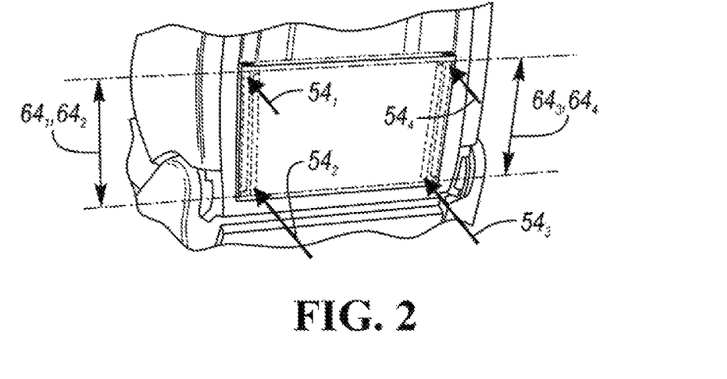
FIG. 2 is a side schematic view of the map pocket assembly of FIG. 1 in a closed position.

Spring arms $22_1$, $22_2$, $22_3$, $22_4$ may be coupled to map pocket panel 18 at free ends $48_1$, $48_2$, $48_3$, $48_4$, respectively, such that free ends $48_1$, $48_2$, $48_3$, $48_4$ move with map pocket panel 18 between the closed and open positions. In the illustrated embodiment, free ends $48_1$, $48_4$ of spring arms $22_1$, $22_4$, respectively, are coupled to top portion 34 of map pocket panel 18; free ends $48_2$, $48_3$, of spring arms $22_2$, $22_3$, respectively, are coupled to bottom portion 36 of map pocket panel 18; hinge ends $40_1$, $40_4$, of spring arm $22_1$, $22_4$ are disposed proximate bottom portion 36 of map pocket panel 18; and hinge ends $40_2$, $40_3$, of spring arms $22_2$, $22_3$, are disposed proximate top portion 34 of map pocket panel 18. Specifically, free end $48_1$ of spring arm $22_1$ is coupled to and biases a top corner $50_1$ of map pocket panel 18 to the closed position; free end $48_4$ of spring arm $22_4$ is coupled to and biases a top corner $50_2$ of map pocket panel 18 opposite of top corner $50_1$ to the closed position; free end $48_2$ of spring arm $22_2$ is coupled to and biases a bottom corner $52_1$ of map pocket panel 18 to the closed position; and free end $48_3$ of spring arm $22_3$ is coupled to and biases a bottom corner $52_2$ of map pocket panel 18 opposite of bottom corner $52_1$ to the closed position. One of ordinary skill in the art will understand, however, that the free ends may bias other corners or portions of the map pocket panel to the closed position. As shown in FIG. 2, free ends $48_1$, $48_2$, $48_3$, $48_4$, may each apply a force $54_1$, $54_2$, $54_3$, $54_4$ to seat back panel 16 in the closed position and may travel a fore-aft distance 56 (FIG. 5) from seat back panel with map pocket panel 18 between the closed and open positions. In the open position (FIG. 5), spring arms $22_1$, $22_2$, $22_3$, $22_4$ may be disposed at an angle $58_1$, $58_2$, $58_3$, $58_4$, respectively, relative to seat back panel 16. As shown in FIGS. 3-5, top and bottom portions 34, 36 of map pocket panel 18 may move independently one another via spring arms $22_1$, $22_2$, $22_3$, $22_4$.

Figure 6:
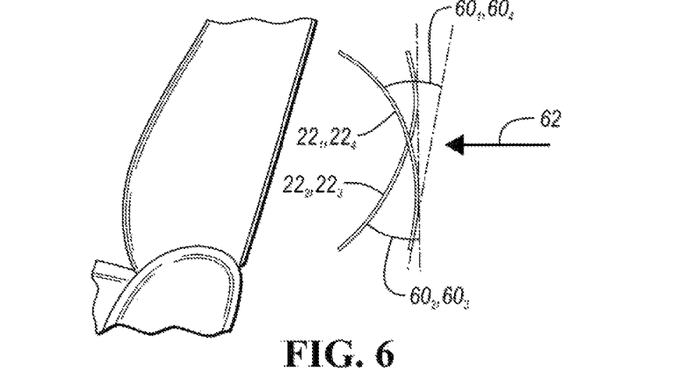
FIG. 6 is a side elevational view of spring arms of the map pocket assembly of FIG. 1 prior to assembly.

FIG. 6 is a side elevational view of spring arms $22_1$, $22_2$, $22_3$, $22_4$ prior to assembly. In one embodiment, spring arms $22_1$, $22_2$, $22_3$, $22_4$ may be preformed to define spring arm arcs $60_1$, $60_2$, $60_3$, $60_4$, respectively, thereby biasing the map pocket panel 18 to the closed position. Preforming spring arms $22_1$, $22_2$, $22_3$, $22_4$ to be curved or bent in a direction 62 toward seat back panel 16 (prior to coupling with seat back panel 16 and map pocket panel 18) allows spring arms $22_1$, $22_2$, $22_3$, $22_4$ to (1) have a biasing effect on map pocket panel 18 once coupled thereto and (2) conform to a profile 63 of seat back panel 16 once coupled thereto in the closed position (as best shown in FIG. 2). Spring arm arcs $60_1$, $60_2$, $60_3$, $60_4$ may be designed according to the following equations (Eqns. 1-3):

$$w(x) = \frac{Fl^3}{6EI_y}\left[2 - 3\frac{x}{l} + \left(\frac{x}{l}\right)^3\right] \quad \text{Eqn. 1}$$

$$f = \frac{Fl^3}{3EI_y} \quad \text{Eqn. 2}$$

$$\alpha = \frac{Fl^2}{2EI_y} \quad \text{Eqn. 3}$$

where $I_y$ is the axial arial moment (second area moment), E is the modulus of elasticity, F is force, l is the length of the beam, f is deflection distance, and α is angle of inclination. Spring arms $22_1$, $22_2$, $22_3$, $22_4$ may each have a height $64_1$, $64_2$, $64_3$, $64_4$, respectively, (FIG. 2) which may be l in the above equations 1-3. Furthermore, f may be the fore-aft distance 56, and F may be forces $54_1$, $54_2$, $54_3$, $54_4$. As such, one of ordinary skill in the art may adjust the variables in the above equations to design spring arms suitable for the specific application. Spring arms $22_1$, $22_2$, $22_3$, $22_4$ may be comprised of metal or plastic. In one embodiment, spring arms $22_1$, $22_2$, $22_3$, $22_4$ may be comprised of a thermosetting plastic or a thermoplast that is fiber enforced or hot formed from raw material plates. The material(s) of the spring arms may vary depending on the application and desired deflection characteristics. As illustrated, when spring arms $22_1$, $22_2$, $22_3$, $22_4$ are in the open position, they are curved in a direction 66 opposite of the preformed spring arm arcs $60_1$, $60_2$, $60_3$, $60_4$, respectively (FIG. 6). Furthermore, although in the illustrated embodiment spring arms $22_1$, $22_2$, $22_3$, $22_4$ are similar in size and shape, one of ordinary skill in the art will understand that the spring arms may be dissimilar in size and shape.

The map pocket assembly 12 with spring arms $22_1$, $22_2$, $22_3$, $22_4$ may carry minimal cost and require minimal space. Moreover, the shape of the spring arms $22_1$, $22_2$, $22_3$, $22_4$ can be adapted to the profile of the seat back panel. In some embodiments, the spring arms can be designed such that the forces or pressures on the seat back panel are distributed across height $64_1$, $64_2$, $64_3$, $64_4$ of the respective spring arm $22_1$, $22_2$, $22_3$, $22_4$ to minimize local wear and deformation at the top and bottom corners of the map pocket panel 18.

Figure 7:
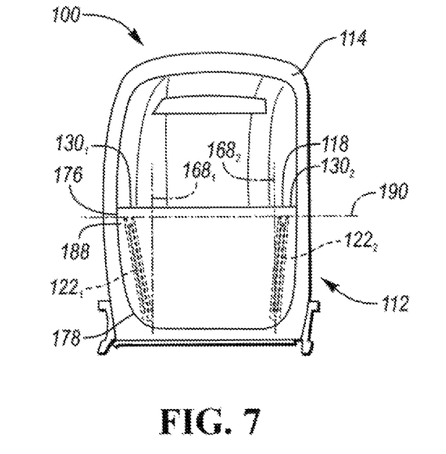
FIG. 7 is a rear schematic view of a vehicle seat with a map pocket assembly according to another embodiment of the instant disclosure.
Figures 8, 10, 11:
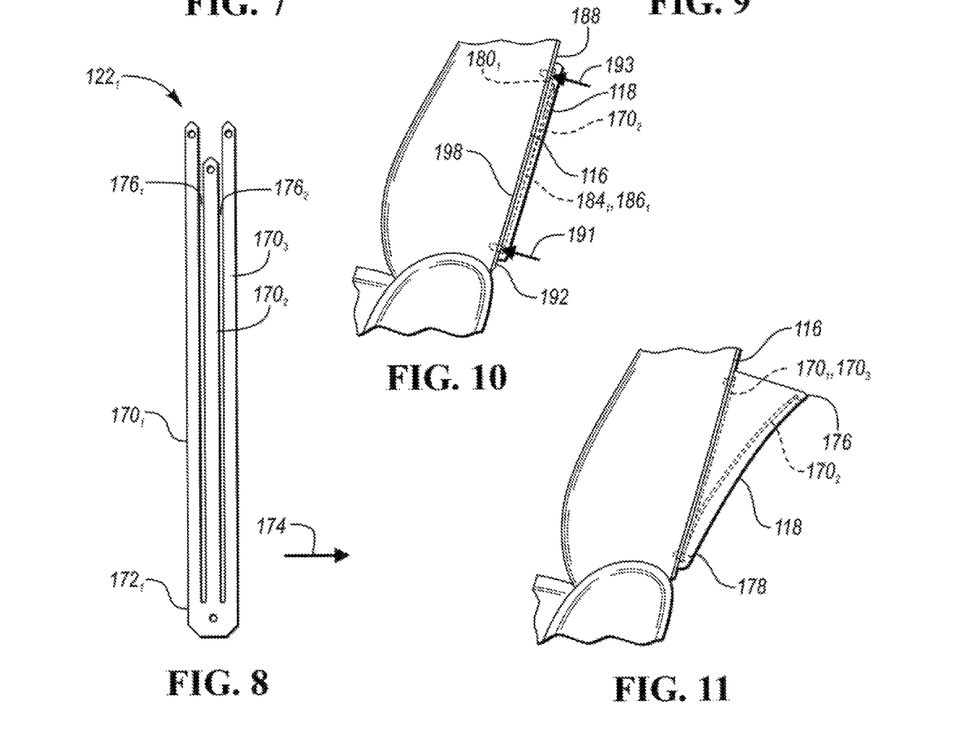
FIG. 8 is a front elevational view of a spring arm of the map pocket assembly of FIG. 7.
FIG. 10 is a side schematic view of the map pocket assembly of FIG. 7 in a closed position.
FIG. 11 is a side schematic view of the map pocket assembly of FIG. 7 in a top-open position.
Figure 9:
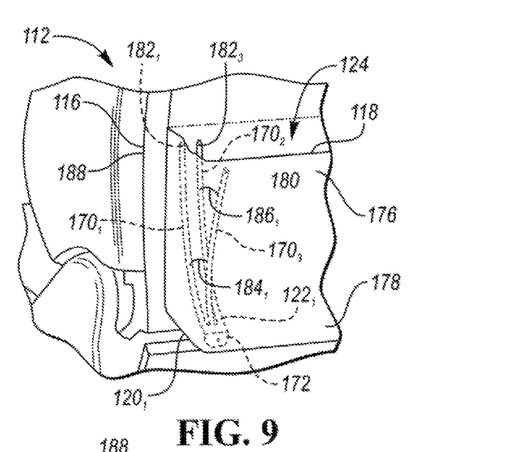
FIG. 9 is a rear perspective view of the map pocket assembly of FIG. 7 in an open position.
Figure 12:
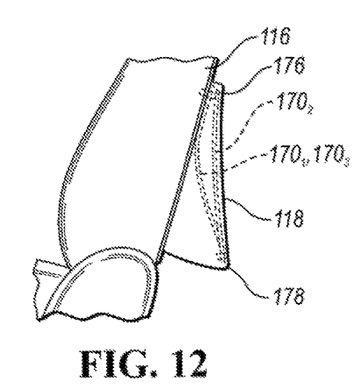
FIG. 12 is a side schematic view of the map pocket assembly of FIG. 7 in a bottom-open position.

FIG. 7 is a rear schematic view of a vehicle seat 100 with a map pocket assembly 112 according to another embodiment of the instant disclosure. FIG. 8 is a front elevational view of a spring arm $122_1$ of the map pocket assembly 112 of FIG. 7. FIGS. 9-13 are side schematic views of map pocket assembly 112 of FIG. 7 in various positions. Vehicle seat 100 may comprise a seat back 114 and map pocket assembly 112 attached thereto. Map pocket assembly 112 may include a seat back panel 116 adapted to attach to seat back 114, a map pocket panel 118, map pocket side panels $120_1$, $120_2$ (FIG. 9) extending therebetween, and spring arms $122_1$, $122_2$. In an embodiment, map pocket panel 118 is coupled to the seat back panel 116 (FIG. 9) and moveable between a closed position and an open position relative to seat back panel 116 to define a pocket opening 124 therebetween (see FIGS. 9 and 13 for open position). Spring arms $122_1$, $122_2$ may each move independently of one another and couple seat back panel 116 to map pocket panel 118 to bias map pocket panel 118 to the closed position. Furthermore, in one embodiment, spring arms $122_1$, $122_2$ may be disposed in sleeves $130_1$, $130_2$ between map pocket panel 118 and seat back panel 116 such that spring arms $122_1$, $122_2$ are hidden from view and do not interfere with objects stored within map pocket assembly 112. Referring to FIG. 7, although in the illustrated embodiment spring arms $122_1$, $122_2$ are angled relative to vertical axes $168_1$, $168_2$, respectively, relative to seat back panel 116, one of ordinary skill in the art will understand that spring arms $122_1$, $122_2$ may be disposed at various angles relative to vertical axes $168_1$, $168_2$.

In the illustrated embodiment, spring arms $122_1$, $122_2$ are similar in size and shape; however, one of ordinary skill in the art will understand that the spring arms may be dissimilar in size and/or shape. The following description is in reference to spring arm $122_1$ but may also apply to spring arm $122_2$ in accordance with the illustrated embodiment. Spring arm $122_1$ may have spring fingers $170_1$, $170_2$, $170_3$ extending from a spring base 172, the spring base 172 being coupled to one of the seat back panel 116 and the map pocket panel 118. As shown in FIG. 8, spring fingers $170_1$, $170_2$, $170_3$ may be spaced from one another in a lateral direction 174 (relative to spring arm $122_1$). Spring arm $122_1$ may also include gaps $176_1$, $176_2$ between spring fingers $170_1$, $170_2$ and between spring fingers $170_2$, $170_3$, respectively. Although in the illustrated embodiment, spring arm $122_1$ includes three spring fingers $170_1$, $170_2$, $170_3$, one of ordinary skill in the art will understand that the spring arm may include more or less spring fingers.

Spring fingers $170_1$, $170_3$ may be coupled to the seat back panel 116, and spring finger $170_2$ may be coupled to map pocket panel 118. Spring fingers $170_1$, $170_2$, $170_3$ may be hinged together at spring base 172, thereby defining a pair of outer fingers $170_1$, $170_3$ and a center finger $170_2$. In some embodiments, spring finger $170_2$ may move independently of spring fingers $170_1$ and/or $170_3$ such that both a top portion 176 and a bottom portion 178 of map pocket panel 118 move independently of each other to accommodate the size and shape of objects stored within map pocket assembly 112. Spring fingers $170_1$, $170_3$ may prevent twisting of spring base 172 relative to map pocket panel 118 as spring finger $170_2$ moves relative to spring fingers $170_1$, $170_3$. In some embodiments, a free end 180 of spring finger $170_2$ opposite spring base 172 may move independently of spring base 172 and of distal ends 182$_1$, 182$_3$ of spring fingers 170$_1$, 170$_3$, respectively, opposite the spring base 172 (distal ends 182$_1$, 182$_3$ being coupled to seat back panel 116). Furthermore, spring base 172 may move independently of distal ends 182$_1$, 182$_3$ and of free end 180.

Spring fingers 170$_1$, 170$_2$ may be moved to a spring angle 184' relative to each other when map pocket panel 118 is moved to the open position (FIG. 9) that is greater than the spring angle 184 when the map pocket panel 118 is in the closed position (FIG. 10). Similarly, spring fingers 170$_2$, 170$_3$ may be moved to a spring angle 186' relative to each other when map pocket panel 118 is moved to the open position (FIG. 9) that is greater than spring angle 186 when the map pocket panel 118 is in the closed position (FIG. 10). In one embodiment, spring fingers 170$_1$, 170$_3$ are each coupled to a top portion 188 of seat back panel 116 at points along a horizontal line 190 (relative to seat back panel 116) such that spring angles 184, 186 are approximately equal between the closed and open positions.

Figure 13:
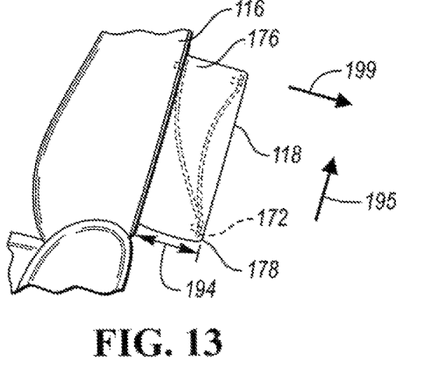
FIG. 13 is a side schematic view of the map pocket assembly of FIG. 7 in an open position.

In the illustrated embodiment, spring base 172 applies a force 191 to a bottom portion 192 of seat back panel 116 in the closed position to bias bottom portion 178 of map pocket panel 118 to the closed position, and free end 180 of spring finger 170$_2$ applies a force 193 to top portion 188 of seat back panel 116 in the closed position. Referring to FIG. 13, in the illustrated embodiment spring base 172 is coupled to bottom portion 178 of map pocket panel 118 such that spring base 172 travels a fore-aft distance 194 with bottom portion 178 of map pocket panel 118 between the closed and open positions. However, one of skill in the art will understand that the spring arm may be flipped upside down (relative to a vertical direction 195) such that the spring base is coupled to the top portion of the map pocket panel.

Figure 14:
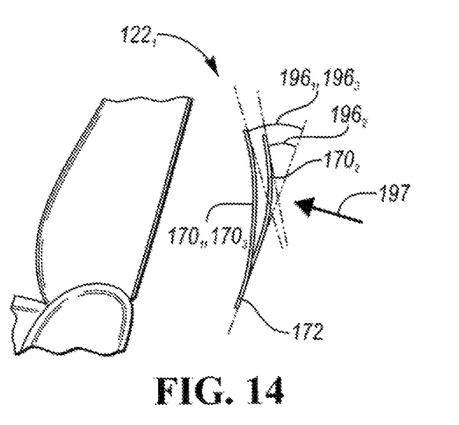
FIG. 14 is a side elevational view of the spring arms of the map pocket assembly of FIG. 7 prior to assembly.

FIG. 14 is a side elevational view of spring arm 122$_1$ of the map pocket assembly 112 of FIG. 7 prior to assembly. As illustrated, spring fingers 170$_1$, 170$_3$ may be preformed to define a finger arc 196$_1$, 196$_3$, respectively, to bias one of top portion 176 and bottom portion 178 of map pocket panel 118 to the closed position. By being hinged with spring fingers 170$_1$ and/or 170$_3$ at spring base 172, spring finger 170$_2$ may be biased toward spring fingers 170$_1$ and/or 170$_3$ and, thus, apply force 193 in the closed position. In some embodiments, spring finger 170$_2$ may be preformed to define finger arc 196$_2$ to bias top portion 176 of map pocket panel 118 to the closed position. Preforming spring fingers 170$_1$, 170$_2$, 170$_3$ to be curved or bent in a direction 197 toward seat back panel 116 (prior to coupling with seat back panel 116 and map pocket panel 118) allows spring fingers 170$_1$, 170$_2$, 170$_3$ to (1) have a biasing effect on map pocket panel 118 once coupled thereto and (2) conform to a profile 198 (FIG. 10) of seat back panel 116 once coupled thereto in the closed position (as best shown in FIG. 11). Finger arcs 196$_1$, 196$_2$, 196$_3$ may be designed according to the above Eqns. 1-3. As such, one of ordinary skill in the art may adjust the variables in the above equations to design spring arms suitable for the specific application. As illustrated in FIG. 13, when spring arm 122$_1$ is in the open position, spring fingers 170$_1$, 170$_2$ are curved in a direction opposite 199 of the preformed finger arcs 196$_1$, 196$_2$ (FIG. 14).

Spring arm 122$_1$ may be comprised of metal or plastic. In one embodiment, spring arm 122$_1$ may be comprised of a thermosetting plastic or a thermoplast that is fiber enforced or hot formed from raw material plates. The material(s) of spring arm 122$_1$ may vary depending on the application and desired deflection characteristics. Moreover, spring fingers 170$_1$, 170$_2$, 170$_3$ may each be comprised of the same or different materials. In addition, forces 191, 193 can be determined by varying the width, thickness, and length of spring fingers 170$_1$, 170$_2$, 170$_3$.

Figure 15:
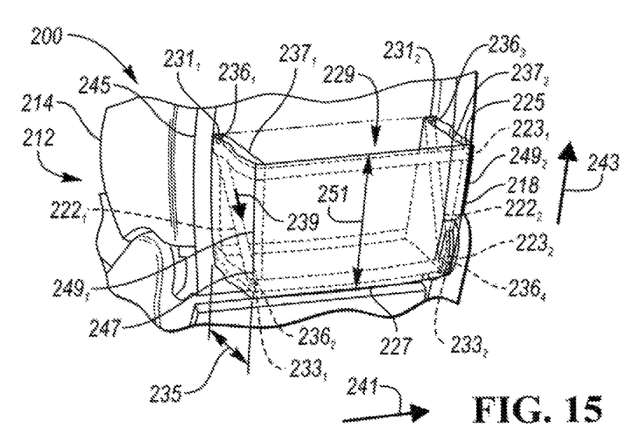
FIG. 15 is a rear schematic view of a vehicle seat with a map pocket assembly in an open position according to another embodiment of the instant disclosure.
Figure 16:
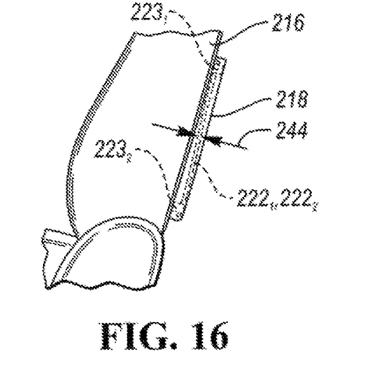
FIG. 16 is a side schematic view of the map pocket assembly of FIG. 15 in a closed position.

FIG. 15 is a rear schematic view of a vehicle seat 200 with a map pocket assembly 212 in an open position according to another embodiment of the instant disclosure. FIG. 16 is a side schematic view of the map pocket assembly 212 of FIG. 15 in a closed position. Map pocket assembly 212 may include a seat back panel 216, a map pocket panel 218 coupled to seat back panel 216, support arms 222$_1$, 222$_2$, and elastic members 223$_1$, 223$_2$. Map pocket panel 218 may be coupled to seat back panel 216 and have a top edge 225 and a bottom edge 227, each moveable between a closed position and an open position relative to seat back panel 216 to define a map pocket opening 229 therebetween. Support arms 222$_1$, 222$_2$ may be coupled to seat back panel 216 at ends 231$_1$, 231$_2$, respectively, and coupled to map pocket panel 218 at ends 233$_1$, 233$_2$, respectively (opposite ends 231$_1$, 231$_2$) to maintain a fore-aft opening distance 235 of bottom edge 227 of map pocket panel 218 generally perpendicular to seat back panel 216 when bottom edge 227 is in the open position. Support arms 222$_1$, 222$_2$ may be coupled to seat back panel 216 and map pocket panel 218 via thru-holes at ends 231$_1$, 231$_2$, 233$_1$, 233$_2$, and fastening members 236$_1$, 236$_2$, 236$_3$, 236$_4$ that extend through thru-holes and into seat back panel 216 or map pocket panel 218. One of ordinary skill in the art will understand that there are several ways to couple the support arms to seat back panel and map pocket panel. Furthermore, support arms 222$_1$, 222$_2$ may be disposed in sleeves 237$_1$, 237$_2$ of map pocket assembly 212 such that support arms 222$_1$, 222$_2$ are not visible and do not interfere with objects stored within map pocket assembly 212. Support arms 222$_1$, 222$_2$ may be comprised of metal or plastic. In one embodiment, support arms 222$_1$, 222$_2$ may be comprised of a thermosetting plastic or a thermoplast that is fiber enforced or hot formed from raw material plates. Support arms 222$_1$, 222$_2$ may be rigid in a longitudinal direction 239 (relative to the respective support arm) to prevent movement of map pocket panel 218 in a horizontal direction 241 and a vertical direction 243 (relative to seat back panel 216). In one embodiment, support arms 222$_1$, 222$_2$ may each have a thickness (represented as 244 in FIG. 16) of two millimeters. Although in the illustrated embodiment, support arms 222$_1$, 222$_2$ are similar in size and shape, one of ordinary skill in the art will understand that the supports arms may be dissimilar in size and/or shape. Furthermore, although in the illustrated embodiment support arms 222$_1$, 222$_2$ each are coupled to a top portion 245 of seat back panel 216 and a bottom portion 247 of map pocket panel 218, the support arms may be coupled to the seat back panel and the map pocket panel at various locations within the spirit and scope of this disclosure.

Elastic member 223$_1$ may be connected between seat back panel 16 and map pocket panel 118 adjacent top edge 225 thereby biasing top edge 225 of map pocket panel 118 to the closed position. Elastic member 223$_2$ may be connected between seat back panel 216 and map pocket panel 218 adjacent bottom edge 227 thereby biasing bottom edge 227 of map pocket panel 118 to the closed position. Elastic members 223$_1$, 223$_2$ each may be disposed along opposite lateral sides 249$_1$, 249$_1$ of map pocket panel 218. In the illustrated embodiment, elastic members 223$_1$, 223$_2$ each extend around map pocket panel 218, along sides 249$_1$, 249$_2$ of map pocket assembly 212, and into seat back panel 216. Although elastic members 223$_1$, 223$_2$ each form a single continuous loop through seat back panel 216 and map pocket panel 218, one of ordinary skill in the art will understand that the elastic members may be of any length and/or form multiple loops around the map pocket assembly. In addition, in some embodiments the elastic members may extend around the top and bottom edges of the map pocket panel such that the elastic members extend in the vertical direction 243 across a height 251 of the map pocket panel. In other embodiments, the elastic members extend across the top and bottom edges of the map pocket panel. As the length of the elastic members $223_1$, $223_2$ may be inversely proportional to tensile strain, increasing the length of elastic members $223_1$, $223_2$ may result in a decreased force required to move map pocket panel 218 from the closed position to the open position (i.e., to travel fore-aft opening distance 235).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. Furthermore, although the embodiments disclose map pocket assemblies coupled to vehicle seats, the embodiments disclosed herein may be coupled to other components of the vehicle.

What is claimed is:

1. A map pocket assembly comprising:
    a seat back panel adapted to attach to a seat back;
    a map pocket panel coupled to the seat back panel and moveable between a closed position and an open position relative to the seat back panel to define a pocket opening therebetween; and
    a pair of spring arms coupling the seat back panel to the map pocket panel to bias the map pocket panel to the closed position, each spring arm having first and second spring fingers extending from a spring base, the spring base coupled to one of the seat back panel and the map pocket panel, a free end of the first spring finger coupled to the seat back panel and a free end of the second spring finger coupled to the map pocket panel,
    wherein the free ends of the first and second spring fingers of each spring arm are spaced from each other in a lateral direction and are moved to an open spring angle in a fore-aft direction relative to each other when the map pocket panel is moved to the open position, wherein the open spring angle is greater than a closed spring angle when the map pocket panel is in the closed position.

2. The map pocket assembly of claim 1, wherein the spring base is coupled to the map pocket panel such that the spring base travels a fore-aft distance with the map pocket panel between the closed and open positions, and the first spring finger is preformed to define a first finger arc to bias one of a top and bottom portion of the map pocket panel to the closed position such that the spring base applies a first force to one of the top and bottom portions of the seat back panel in the closed position.

3. The map pocket assembly of claim 2, wherein the free end of the second spring finger opposite the spring base applies a second force to the other of the top and bottom portions of the seat back panel in the closed position and moves independently of the free end of the first spring finger opposite the spring base in the open position, the free end of the first spring finger being coupled to the seat back panel.

4. The map pocket assembly of claim 2, wherein the second spring finger is preformed to define a second finger arc to bias the other of the top and bottom portion of the map pocket panel to the closed position.

5. The map pocket assembly of claim 2, wherein in the closed position, the first spring finger conforms to a profile of the seat back panel, and in the open position, the first spring finger is curved in a direction opposite of the first finger arc.

6. The map pocket assembly of claim 1, wherein a height of the second spring finger is less than a height of the first spring finger.

7. The map pocket assembly of claim 1, wherein the spring arm further comprises a third spring finger hinged together at the spring base with the first and second spring fingers, thereby defining a pair of outer spring fingers and a center spring finger, wherein the third spring finger prevents twisting of the spring base relative to the map pocket panel.

8. The map pocket assembly of claim 7, wherein the third spring finger is coupled to the seat back panel, and wherein the third spring finger is preformed to define a third finger arc to bias the map pocket panel to the closed position.

9. The map pocket assembly of claim 7, wherein the third spring finger is preformed to define a third finger arc to bias the map pocket panel to the closed position, wherein the first, second, and third spring fingers are spaced from one another in the lateral direction.

10. The map pocket assembly of claim 1, wherein the free end of the first spring arm is coupled to a top portion of the map pocket panel.

11. A vehicle seat comprising: a seat back; and the map pocket assembly of claim 1.

12. A vehicle seat comprising: a seat back panel; a map pocket panel coupled to the seat back panel and moveable between a closed position and an open position; and a first spring arm hinged to the seat back panel at a hinge end and coupled to the map pocket panel at a free end such that the free end moves with the map pocket panel between the closed and open positions, the first spring arm being preformed to define a first spring arm arc thereby biasing the map pocket panel to the closed position, wherein in the closed position the first spring arm conforms to a profile of the seat back panel, and wherein in the open position, the first spring arm is curved in a direction opposite of the first spring arm arc.

13. The vehicle seat of claim 12, wherein the free end of the first spring arm applies a first force to the seat back panel in the closed position.

14. The vehicle seat of claim 12, wherein the free end of the first spring arm is coupled to a top portion of the map pocket panel.

15. The vehicle seat of claim 14, further comprising a second spring arm disposed proximate the first spring arm, wherein the second spring arm is hinged to the seat back panel at a hinge end and coupled to a bottom portion of the map pocket panel at a free end such that the free end of the second spring arm moves with the bottom portion of the map pocket panel between the closed and open positions, and the second spring arm is preformed to define a second spring arm arc thereby biasing the map pocket panel to the closed position and applying a second force to the seat back panel in the closed position.

16. The vehicle seat of claim 12, further comprising a second spring arm spaced apart in a lateral direction from the first spring arm.

17. The vehicle seat of claim 12, wherein the hinge end of the first spring arm is disposed proximate a bottom portion of the map pocket panel.

18. A vehicle seat comprising: a seat back panel; a map pocket panel coupled to the seat back panel and having a top edge and a bottom edge each moveable between a closed position and an open position relative to the seat back panel to define a map pocket opening therebetween; and a support arm coupled to the seat back panel at a first end and coupled to the map pocket panel at a second end to maintain a fore-aft opening distance of the bottom edge of the map pocket panel generally perpendicular to the seat back panel when the bottom edge is in the open position.

19. The vehicle seat of claim 18, further comprising a first elastic member connected between the seat back panel and the map pocket panel adjacent the top edge thereby biasing the top edge of the map pocket panel to the closed position.

20. The vehicle seat of claim 19, further comprising a second elastic member connected between the seat back panel and the map pocket panel adjacent the bottom edge thereby biasing the bottom edge of the map pocket panel to the closed position, wherein each of the first and second elastic members are disposed along opposite lateral sides of the map pocket panel.

* * * * *